Patented June 15, 1954

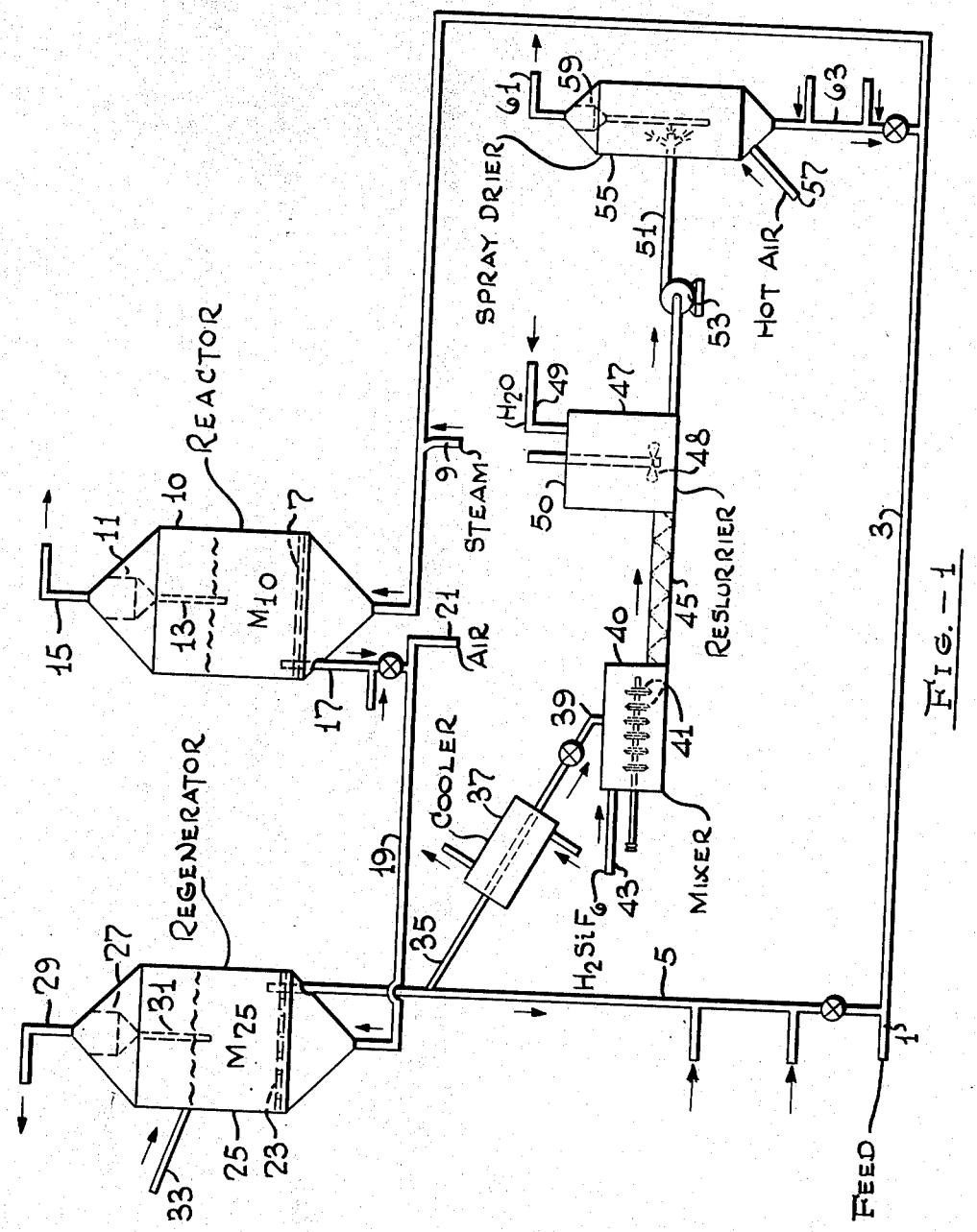

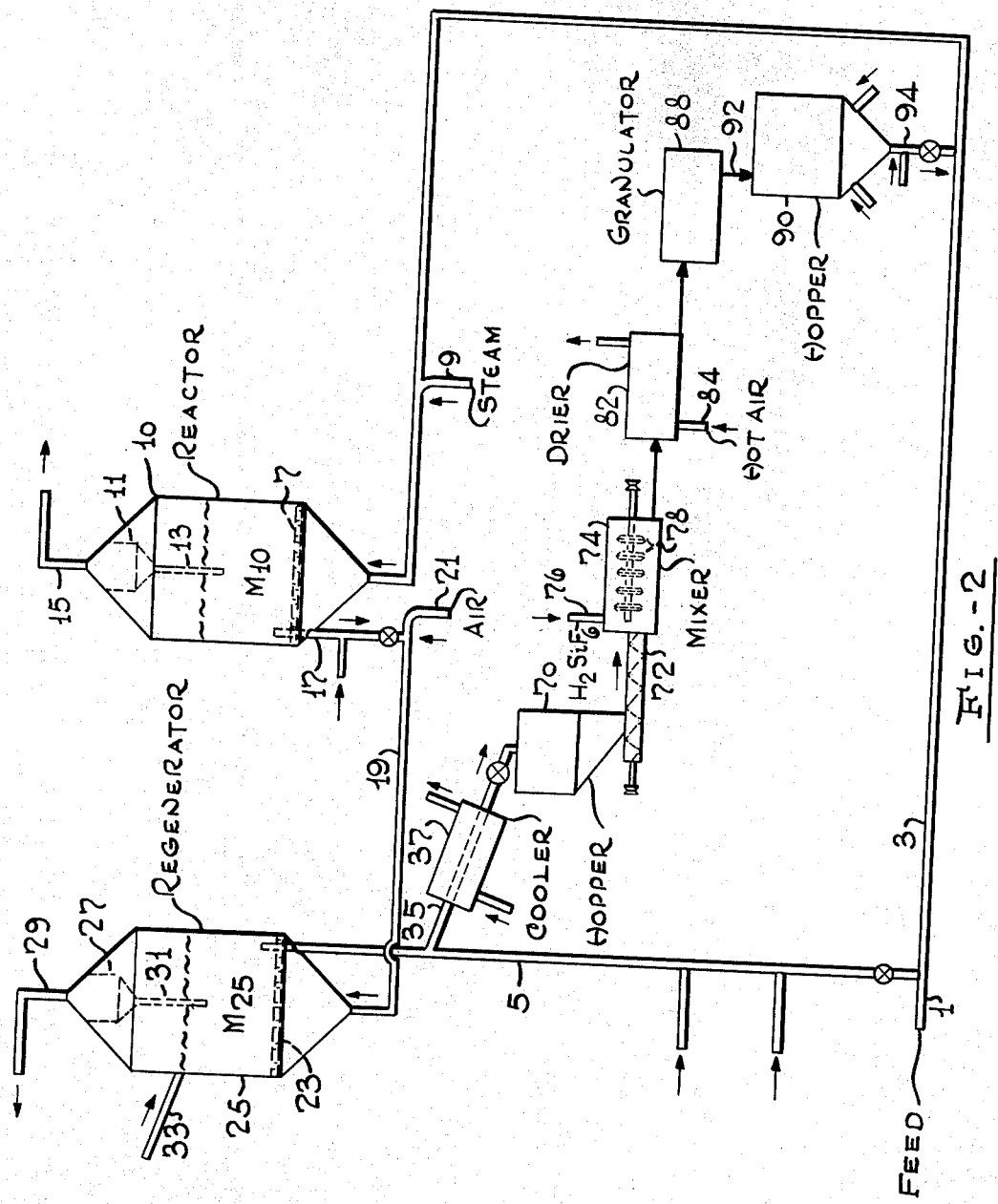

2,681,305

UNITED STATES PATENT OFFICE 2,681,305

REVIVIFICATION OF A SILICIOUS CRACKING CATALYST BY TREATING WITH FLUOSILICIC ACID

Sumner B. Sweetser, Cranford, N. J., assignor to Standard Oil Development Company, a corporation of Delaware Application February 28, 1951, Serial No. 213,130

13 Claims. (Cl. 196—52)

The present invention relates to the revivification of catalysts used in catalytic hydrocarbon conversions involving hydrocarbon cracking. More particularly, the invention pertains to a process for revivifying catalysts which are subject to contamination and deterioration by the deposition of contaminants resulting from the prolonged use of the catalysts in the continuous type of catalytic hydrocarbon cracking operations wherein a subdivided catalyst is circulated between a cracking zone and a regeneration zone, heat required for the cracking reaction being supplied as sensible heat of catalyst reheated in the regeneration zone by the combustion of carbonaceous catalyst deposits. In its broadest aspect, the invention contemplates the revivification of catalysts deteriorated as the result of their prolonged use in such operations, by a treatment with fluosilicic acid ($H_2SiF_6$).

In conventional processes for the catalytic cracking of hydrocarbon oils the feed stock, usually a gas oil, is contacted in the vapor state with a cracking catalyst at temperatures of about 800°–1000° F. and pressures ranging from subatmospheric to 50 p. s. i. g. or higher. Activated clays including acid treated bentonite, synthetic composite gel type catalysts, such as composites containing silica, alumina, and/or magnesia, with or without the addition of activating ingredients, such as boria, chromia, etc. have been used.

In the course of the cracking reaction, coke-like carbonaceous materials are deposited on the catalyst. These contaminating deposits seriously impair the activity of the catalyst. The contaminated catalyst is, therefore, regenerated by burning off carbonaceous deposits with an oxidizing gas such as air at temperatures of about 800°–1200° F. In the continuous type of operation here involved, the catalyst is circulated continuously between the reaction zone and a carbon-burning regeneration zone for the purpose of catalyst regeneration and heat supply.

However, the catalyst also undergoes a second type of deactivation. It has been found that after a prolonged use the catalyst shows a marked decline in activity and particularly in selectivity toward the formation of gasoline range hydrocarbons over ultimate cracking products, such as carbon and gas. This deterioration of the catalyst must be remedied by procedures other than the combustion type of regeneration. The present invention refers to such a procedure.

Various methods for reviving catalysts deteriorated in this manner have been proposed heretofore. The most efficient methods of this type involve a treatment of the catalyst with certain chemicals, particularly fluorine compounds, such as hydrogen fluoride, organic fluorides, etc. It has also been suggested to treat fresh cracking catalysts with fluosilicic acid at conditions conducive to a decomposition of the acid yielding hydrogen fluoride and/or free fluorine so as to increase the activity of the fresh catalyst or similarly to treat used catalysts with $H_2SiF_6$ in order to replace fluorine in catalysts, the activity of which depends on the presence of fluorine in the fresh catalyst and which have been depleted in fluorine content in the course of the cracking operation.

The utility of all these known processes is directly or indirectly predicated on a corroding or etching effect of fluorine or hydrogen fluoride on the surface of the catalyst. If this effect is not closely controlled, the damage done by an excessive removal of active catalyst constituents or by other undesirable changes in the active catalyst centers may nullify or even outweight the beneficial effects of the treatment with fluorine compounds. The careful control thus required greatly complicates these known procedures. The present invention overcomes this disadvantage.

It is, therefore, the principal object of the present invention to provide improved means for revivifying cracking catalysts which have been deteriorated in prolonged continuous operation involving catalyst circulation. A more specific object of the invention is an improved method for revivifying such catalysts without corroding or etching effects on the catalyst. Other objects and advantages will appear from the subsequent description of the invention wherein reference will be made to the accompanying drawing.

It has now been found that the gasoline selectivity of cracking catalysts, more particularly synthetic mixed gels of the silica-alumina type which are deteriorated with respect to gasoline selectivity through prolonged use in a system involving continuous catalyst circulation, may be substantially increased by incorporating into the used catalyst about 0.5–5 weight percent, preferably about 1–2 weight percent, of fluosilicic acid at conditions not conducive to the liberation of HF or free fluorine from the acid. The treatment in accordance with the invention may be carried out by soaking the suitably subdivided catalyst in an aqueous solution of $H_2SiF_6$ of about 2–10% concentration at temperatures of about 75°–150° F. for a time sufficient to incorporate by impregnation about 0.5–5 weight percent of $H_2SiF_6$ into the catalyst.

At these conditions, no decomposition of fluosilicic acid takes place and the acid is non-corrosive so that the catalyst is not damaged by over-treatment. However, the acid forms insoluble salts with metallic catalyst contaminants, particularly with iron and these salts such as iron fluosilicate are non-volatile and stable at the conditions of the cracking process. The result is that catalyst corrosion by the treating agent is avoided in all stages of the process and that losses of treating agent in the course of the revivification and cracking process are insignificant. The revivifying effect secured in accordance with the present invention is, therefore, much more persistent than that of fluorine compounds used in accordance with prior art procedures.

While the invention affords improvements in connection with most conventional cracking catalysts, best results are consistently obtained when synthetic composite gels comprising silica gel and minor proportions of alumina are employed. The catalyst best suited for the purposes of the invention is a composite of this type containing about 85–88% silica gel and about 12–15%, preferably about 13%, of alumina.

The process of the invention has utility in all types of continuous cracking operations involving catalyst circulation between reaction and regeneration zones, such as fluid, moving bed or suspensoid systems. These operations differ basically from fixed bed operations with respect to catalyst deterioration. Catalyst deactivation by carbon deposition occurs in fixed bed as well as in continuous operation. However, the type of catalyst deterioration which requires revivifying treatments in addition to the conventional regeneration by carbon removal presents a serious problem only in continuous operation. The catalyst contaminants responsible for this type of catalyst deterioration are partly introduced with the oil feed, particularly in the form of metal salts, and partly picked up by the circulating catalyst in the form of iron from equipment walls. In fixed bed operation the feed contaminants are retained by the catalyst layers first contacted by the feed, which act as a filter bed and no iron is picked up from equipment walls by the stationary catalyst. In continuous operation, however, the feed contaminants are deposited on the entire catalyst and the circulating catalyst has an eroding effect on the equipment walls, resulting in excessive catalyst contamination. These effects are particularly pronounced in the fluid catalyst technique which involves circulation of large amounts of catalyst at relatively high velocities. On the other hand, this technique affords greatest advantages with respect to solids handling, heat transfer and completeness of gas-solids contacting. Therefore, the invention finds its greatest utility in its application to fluid catalytic cracking and this application is the preferred embodiment of the invention.

In conventional fluid operation, powdered catalyst having an average particle size of about 50–80 microns is contacted with the vaporized feed in the form of a dense, turbulent fluidized solids mass simulating a boiling liquid in appearance and hydrostatic and hydrodynamic properties. Fluidization is accomplished by passing the feed vapors upwardly through the solids bed at velocities of about 0.3–3 ft. per second to establish apparent bed densities of about 10–30 lbs. per cu. ft. Suitable cracking conditions include temperatures of about 700°–1100° F. and atmospheric or slightly elevated pressure. Catalyst fouled by coke deposits is withdrawn from the fluidized bed, suspended in air and regenerated by carbon combustion in a regenerator in the form of a similar fluidized solids mass at higher temperatures of about 1000°–1200° F. Hot regenerated catalyst is suspended in the oil feed and returned to the cracking zone.

When employing the invention in combination with a system of this type, catalyst selectivity may be maintained at a desirable level by withdrawing catalyst at the rate of about 1–10% of catalyst inventory per day, incorporating about 0.5–5% of $H_2SiF_6$ into the withdrawn catalyst and returning the catalyst so treated to the system. This treatment may be carried out in continuous or batch operation as will appear more clearly hereinafter. It is essential, however, that dilute solutions of $H_2SiF_6$ not exceeding 13% concentration be used at temperatures not substantially exceeding 150° F. for the incorporation of $H_2SiF_6$ in order to prevent decomposition and resulting corrosive action of the acid.

The beneficial effects of the process of the invention are illustrated by the experimental data reported below. A conventional gel-type silica alumina cracking catalyst containing about 13% of alumina, having an average particle size of about 50–80 microns and having reached an equilibrium activity in a commercial fluid-type catalytic cracking plant comprising a cracking zone operated at about 925° F. and a combustion type regeneration zone operated at about 1100° F. was used. A sample of this "equilibrium" catalyst containing less than about 1 weight per cent of carbon was taken from the circulating catalyst stream.

One portion of the catalyst was wetted at room temperature with about 28 c. c. per 100 grams of catalyst, of an aqueous fluosilicic acid solution containing about 5% of $H_2SiF_6$. The wet material which had the appearance of wet sand was thoroughly mixed for about 5 minutes and then dried in an oven at 210°–225° F. in an atmosphere of air. The dry catalyst contained 1.4 weight per cent of $H_2SiF_6$. The portion of the catalyst sample so treated and the untreated portion were pilled and tested in a fixed bed standard laboratory testing unit to determine their activity and selectivity.

The well established activity and selectivity standards of "Distillate+Loss" ($D+L$), "Carbon Producing Factor" (CPF), and "Gas Producing Factor" (GPF) were relied on. The $D+L$ of a catalyst is determined by a standard test fully described in the literature (Conn and Connolly, Ind. Eng. Chem. vol. 39, page 1138 (1947)). Briefly, a standard feed stock is cracked on the test catalyst at standard conditions and 100 c. c. of the liquid product is distilled in standard equipment. The amount of gasoline distilled at 400° F. is designated as "Distillate" or D, the residue is R and the value $100-(D+R)$ is called loss or L. The sum of $D+L$ is a criterion for catalyst activity and may vary from about 10–20 for deactivated catalysts to about 25–50 for reactivated or fresh cracking catalysts. The "Carbon Producing Factor" (CPF, is the ratio of the carbon produced by the test catalyst to that produced by an uncontaminated catalyst adjusted to the same activity by steam or heat treatment. It ranges from 1.0 for fresh catalyst to 1.5–2.0 or more for used catalyst. The ratio of dry gas (cu. ft. per barrel of oil) produced by the test catalyst to the dry gas produced by uncontaminated catalyst of the same activity is the "Gas Producing Factor" (GPF). Both CPF and GPF may be used to measure catalyst selectivity which is the better the lower these factors.

The results obtained in so testing the treated and untreated catalyst portions described above were as follows.

| Catalyst | Percent D+L | Gas wt., percent | C, percent on feed | CPF | GPF |
|---|---|---|---|---|---|
| Untreated | 23.0 | 5.2 | 1.8 | 1.96 | 2.03 |
| Impregnated with 1.4% H$_2$SiF$_6$ | 28.0 | 5.0 | 1.2 | 1.00 | 1.45 |

The above data show that catalyst activity as determined by D+L as well as catalyst selectivity as determined by CPF and GPF were significantly improved upon treatment of the catalyst in accordance with the invention.

As pointed out above, the invention finds its greatest utility in connection with fluid catalytic cracking. Two modifications of this preferred embodiment of the invention are illustrated in the accompanying drawing wherein Figure 1 is a schematical flow plan of a system adapted to carry out the process of the invention in a continuous manner in combination with a fluid catalytic cracking unit, and Figure 2 is a simplified illustration of a system employing batch operation in the catalyst treating section.

Referring now to Figure 1 of the drawing, the system illustrated essentially comprises a fluid-type cracking reactor 10, a regenerator 25 of similar design, a mixer 40, a reslurrying zone 50 and a spray drier 55. The function and coaction of these elements will be forthwith described.

In operation, a gas oil boiling within the range of about 500°–1000° F. and preheated to a temperature of about 500°–800° F. may be supplied to the system via line 1. The oil feed is discharged into line 3 wherein it is mixed with hot regenerated subdivided catalyst, such as a synthetic silica-alumina mixed gel, supplied to line 3 from line 5 at a temperature of about 1000°–1100° F. The catalyst-oil mixture containing about 3–10 lbs. of catalyst per lb. of oil is introduced at a suitable cracking temperature of about 900°–1000° F. from line 3 through a distributing device such as grid 7 into reactor 10 to form therein above grid 7 a relatively dense turbulent mass of solids M$_{10}$ fluidized by the reacting hydrocarbon vapors and, if desired, by additional steam added via line 9. Reactor 10 may be designed for a superficial linear gas velocity of about 0.5–1.5 ft. per second and an apparent density of mass M$_{10}$ of about 20–40 lbs. per cu. ft. assuming an average catalyst particle size of about 40–80 microns. Cracked oil vapors and entrained catalyst fines leave reactor 10 through gas-solids separation means such as cyclone separator 11. Separated solids may be returned to mass M$_{10}$ via dip-pipe 13 and product vapors may be passed via line 15 to conventional product recovery equipment (not shown).

Catalyst contaminated with carbonaceous deposits may be withdrawn from mass M$_{10}$ via a conventional aerated standpipe 17 substantially at the rate at which catalyst is supplied to reactor 10 via line 3. The withdrawn catalyst, preferably after conventional stripping, is discharged into line 19 wherein the catalyst is suspended in air supplied from line 21. The suspension is passed via grid 23 to regenerator 25 to form therein a fluidized mass M$_{25}$ similar to mass M$_{10}$. Carbonaceous deposits are burned off the catalyst in mass M$_{25}$ at temperatures of about 1000°–1200° F. Flue gases leave regenerator 25 through cyclone 27 and line 29, separated solids being returned to mass M$_{25}$ via dip-pipe 31. Fresh make-up catalyst may be added via line 33 as required. Hot regenerated catalyst is withdrawn from mass M$_{25}$ via conventional aerated standpipe 5 and, preferably after conventional stripping, returned to line 3 as previously described. The process described up to this point is conventional, various procedural and equipment details obvious to the expert having been omitted for the sake of simplicity.

After the system has been operated for a certain length of time in the manner described, the selectivity of the catalyst has dropped from a CPF value of 1 for the fresh catalyst to a CPF value approaching or exceeding 2 causing the operating efficiency to drop sharply. At this or any desired earlier time the treatment in accordance with the invention is employed. For this purpose, a catalyst stream amount to about 1–10% of the total catalyst inventory of the system per day may be branched off standpipe 5 and passed through line 35 to a cooler 37 wherein the catalyst temperature is reduced to a temperature of about 75°–150° F.

The cooled catalyst flows through line 39 to a mixer 40 provided with kneading arms 41 or the like. An aqueous solution of fluosilicic acid of about 2–10% concentration is sprayed from line 43 at room temperature onto the catalyst in mixer 40 in amounts sufficient to give the catalyst the consistency of wet sand and to supply about 0.5–5% of H$_2$SiF$_6$ to the catalyst. About 0.06–0.085 gal. of acid solution per lb. of catalyst is sufficient for this purpose. The catalyst and acid are intimately mixed for a period of about 2–10 minutes and then moved through mixer 40 by kneaders 41. The mixture is picked up by a screw conveyor 45 and passed to reslurrying vessel 47 provided with stirrer 48. Water sufficient in amount to convert the mixture into a pumpable slurry is supplied to vessel 47 from line 49. The catalyst slurry formed is withdrawn from vessel 47 via line 51 and sprayed with the aid of pump 53 into a conventional spray drier 55 supplied through line 57 with hot air having a temperature of about 225°–800° F. Waste air is withdrawn through a cyclone separator 59 and line 61. Dry reactivated catalyst is withdrawn from drier 55 via a conventional aerated standpipe 63 and may be supplied to oil feed line 3 and reactor 10 substantially at the rate of catalyst withdrawal via line 35.

The system of Figure 1 permits of various modifications. For example, in place of passing the impregnated catalyst mixture to a reslurrying zone and a spray-drying zone the impregnated catalyst may be passed to a rotary kiln type drier. In this case it may be desirable to granulate the dried catalyst in order to break up loose agglomerates formed in the drying operation. Other modifications may appear to those skilled in the art.

The system described with reference to Figure 1 of the drawing is particularly adapted for continuous operation of the reactivation equipment and, therefore, highly useful in combination with commercial cracking plants of relatively large size. When the smaller size of the cracking plant permits batch reactivation of the catalyst or such a procedure is desirable for other reasons, a system of the type illustrated in Figure 2 of the drawing may be used.

Referring now to Figure 2 of the drawing, the design and operation of the cracking and combustion regeneration stages are essentially the same as those described with reference to Figure 1, like reference characters identifying like equipment elements.

When the selectivity of the catalyst has dropped to a point requiring revivification, spent catalyst is withdrawn through line 35 and cooler 37 and supplied at approximately room temperature to storage hopper 70 until about 2-4% of spent catalyst inventory is collected in hopper 70. Thereafter catalyst flow through line 35 may be stopped and about 10-20% of this catalyst may be supplied by means of screw conveyor 72 to mixer 74. About 0.06-0.085 gal. of 1-5% aqueous fluosilicic acid per lb. of catalyst is supplied to mixer 72 via line 76. The acid and solids are mixed in mixer 72 by means of kneaders 78 for about 5-20 minutes. The pasty mixture is transferred to a drier 82 which may be a tray drier or of any other conventional design. Hot air may be introduced through line 84 at a temperature of about 200°-225° F. for about 2-6 hours. The dried catalyst which is now in the form of lump-sized agglomerates may be passed to a conventional granulator or grinder 88 to be converted to particles of fluidizable size, e. g. to a powder passing 100 mesh. This powder may be supplied to a feed hopper 90. Hopper 90 may be aerated with small amounts of an inert gas, such as nitrogen, flue gas, etc. to maintain the catalyst therein in a readily flowing condition. Revivified catalyst ready for reuse may be returned via conventional standpipe 94 and oil feed line 3 to the cracking system as needed to improve the selectivity of the catalyst in reactor 10, e. g. at approximately the rate at which catalyst was withdrawn through line 35. When the catalyst supply in hopper 90 is exhausted, the revivification treatment may be repeated with a fresh batch of spent catalyst withdrawn through line 35.

The system of Figure 2 may be modified in various respects without deviation from the spirit of the invention. For example, a rotary kiln type drier may be used in place of oven drying on trays.

The process of the invention will be further illustrated by the following specific examples.

*Example I*

A system of the type illustrated in Figure 1 may be employed as follows. In a fluid catalyst cracking plant having a capacity of about 40,000 barrels per day of feed and having a catalyst inventory of 450 tons of an equilibrium silica alumina cracking catalyst, the catalyst is withdrawn through line 35 at the rate of 1.41 tons per hour, cooled in cooler 37 to a temperature of about 250° F. and then discharged into mixer 40. A solution containing 1.5% by weight of fluosilicic acid at a temperature of 75° F. is pumped into the mixer at a rate of 214 gallons per hour. The temperature of the mixture of catalyst and impregnating solution is about 125° F. The rate of charging and discharging of catalyst to and from the mixer is controlled so that the mixer contains 470 lbs. of catalyst at all times and the catalyst, therefore, has a contact time therein of about 10 minutes. The impregnated catalyst is discharged into reslurrying vessel 47 and mixed with 1,880 gallons of water per hour. The rate of charging and discharging to and from the reslurrying vessel is regulated to maintain 63 gallons of slurry therein and thereby to give a 2 minute residence time of the slurry in this zone. The reslurried catalyst is passed through slurry pump 53 into spray drier 55 where it is contacted with hot air or regeneration gas in order to obtain dry catalyst. The amount of hot gas required for the drying operation is about 2 million cu. ft. per hour at a temperature of about 725° F. The catalyst is discharged from the drier at a temperature of 225° F. The discharged catalyst is continuously mixed with the stream of catalyst circulating in line 3 from the regenerator to the reactor.

*Example II*

In a fluid catalyst cracking unit having a feed capacity of about 5,000 barrels per day and with a 60 ton inventory of equilibrium silica-alumina cracking catalyst, a system of the type of Figure 2 may be employed as follows. The amount of catalyst to be treated per day is 6 tons. Two tons of catalyst is withdrawn from regenerator 25, cooled to a temperature of about 250° F. in cooler 37 and discharged into hopper 70. A 500 lb. batch of catalyst is transferred from hopper 70 into mixer 74 while it is sprayed with 38 gallons of a 2.4% solution of fluosilicic acid which is at room temperature. The catalyst and solution are mixed in the vessel for about 10 minutes. The impregnated catalyst is transferred on to trays holding about 100 lbs. of catalyst. The trays are placed in a steam oven 82 where they are maintained for a period of 4 hours at a temperature of 225° F. The dried catalyst is dumped into granular 88 containing a 40 mesh screen where it is treated to break up loose agglomerates which are formed in the drying operation. Granulated catalyst is transferred into hopper 90. The above operation is then repeated with another 500 lb. batch of catalyst until the complete contents of the hopper 70 have been treated. At suitable intervals the revivified catalyst in hopper 90 is discharged into the catalyst stream in line 3 circulating between the regenerator and the reactor.

If the operation is spread over the day on a continuous basis, a drying oven 82 holding 20 trays will have sufficient capacity for treating the catalyst. On the other hand, if the work is to be completed in an 8 hour day, a drying oven of 3-4 times this capacity will be required.

The foregoing description and exemplary operations have served to illustrate specific embodiments of the invention but are not intended to be limiting in scope.

What is claimed is:

1. In the method of revivifying spent siliceous cracking catalysts which have been contaminated with metallic type contaminants and the gasoline selectivity of which has been reduced by extended use in a hydrocarbon cracking system wherein the catalyst is continuously circulated between a cracking zone and a combustion-type regeneration zone, the improvement which comprises withdrawing a portion of said catalyst of reduced selectivity from said system, incorporating into said withdrawn catalyst about 0.5 to 5% by weight of fluosilicic acid at conditions of temperature within the range of 75° to 150° F. non-conducive to the decomposition of said acid to inactivate contaminants, drying and granulating the catalyst so treated to said catalyst, and returning catalyst so treated to said system whereby said contaminants are substantially rendered incapable of deactivating said catalyst.

2. The process of claim 1 in which the catalyst is maintained in said cracking and regeneration zones in the form of dense turbulent solids masses fluidized by upwardly flowing gases to resemble a boiling liquid.

3. The method of revivifying spent siliceous cracking catalysts the gasoline selectivity of which has been reduced by extended use in the cracking of hydrocarbon oils due to metallic type contaminants, which comprises incorporating into said spent catalyst about 0.5 to 5% by weight of fluosilicic acid at a temperature within the range of about 75° to 150° F. and non-conducive to the decomposition of said acid to deactivate contaminating materials and thereby restore said catalyst to activity.

4. The method of revivifying spent siliceous cracking catalysts the gasoline selectivity of which has been reduced by reason of accumulated metallic type contaminants by extended use in the continuous catalytic cracking of hydrocarbon oils to such a degree that it can not be restored by combustion-type regeneration, which comprises impregnating said spent catalyst with an aqueous solution of fluosilicic acid of not more than 13% acid concentration at a temperature within the range of about 75° to 150° F. and non-conducive to the decomposition of said acid until about 0.5–5 weight percent of said acid is incorporated into said catalyst and drying the impregnated catalyst whereby the said contaminants are substantially rendered incapable of deactivating the catalyst.

5. The method of claim 4 in which said catalyst is a silica-alumina composite containing about 12–15% of alumina, said aqueous solution having an acid concentration of about 2–10% and said temperature being about 75°–150° F.

6. The method of claim 5 in which about 1–2 weight percent of fluosilicic acid is incorporated into said catalyst.

7. In the method of revivifying spent silica-alumina cracking catalysts the gasoline selectivity of which has been reduced due to accumulation of metallic type deposits resulting from extended use in a fluid-type hydrocarbon cracking system wherein the catalyst is continuously circulated between a fluid-type cracking zone and a fluid-type carbon-burning regeneration zone until the gasoline selectivity of said catalyst has been reduced to such a degree that it can not be restored by regeneration in said regeneration zone, the improvement which comprises withdrawing from said system a minor proportion of the total catalyst inventory of said system, impregnating said withdrawn catalyst with an aqueous fluosilicic acid solution of not more than 13% acid concentration at a temperature within the range of about 75° to 150° F. and non-conducive to the decomposition of said acid until about 0.5–5 weight percent of said acid is incorporated into said catalyst, drying said impregnated catalyst and returning said dried catalyst to said system substantially at the rate at which said catalyst was withdrawn from said system whereby said deposits of metallic type are rendered incapable of deactivating the catalyst.

8. The process of claim 7 in which said catalyst is continuously withdrawn from said system, continuously impregnated and dried, and said dried catalyst is continuously returned to said system.

9. The process of claim 8 in which said impregnated catalyst is slurried in water to form a pumpable slurry and said slurry is subjected to spray drying to form said dried catalyst.

10. The process of claim 8 in which said impregnated catalyst is dried while being subjected to a tumbling motion and said dried catalyst is granulated to a fluidizable size prior to being returned to said system.

11. The process of claim 7 in which said catalyst is withdrawn from said system in intervals and said dried catalyst is returned to said system in intervals, said impregnating and drying being carried out in batches.

12. The process of claim 10 in which said dried catalyst is granulated to a fluidizable size prior to being returned to said system.

13. The process of claim 7 in which said minor proportion is about 1–10%.

References Cited in the file of this patent
UNITED STATES PATENTS

| Number | Name | Date |
| --- | --- | --- |
| 2,336,165 | Connolly | Dec. 7, 1943 |
| 2,380,489 | Bailie | July 31, 1945 |
| 2,483,131 | Garrison | Sept. 27, 1949 |
| 2,580,004 | Corneil | Dec. 25, 1951 |